United States Patent
Barre et al.

(10) Patent No.: US 7,000,871 B2
(45) Date of Patent: Feb. 21, 2006

(54) ICE DETECTION ASSEMBLY INSTALLED ON AN AIRCRAFT

(75) Inventors: Cyril Barre, Issoudun (FR); David Lapeyronnie, Levet (FR); Gurvan Salaun, Bourges (FR)

(73) Assignee: Auxitrol S.A., (FR)

( * ) Notice: Subject to any disclaimer, the term of this patent is extended or adjusted under 35 U.S.C. 154(b) by 0 days.

(21) Appl. No.: 10/727,819

(22) Filed: Dec. 3, 2003

(65) Prior Publication Data

US 2005/0103927 A1 May 19, 2005

(30) Foreign Application Priority Data

Nov. 18, 2003 (FR) .................................. 03 13470

(51) Int. Cl.
*G08B 19/02* (2006.01)
(52) U.S. Cl. ................................... 244/134 F; 340/580
(58) Field of Classification Search ..... 244/134 R–134 F; 73/583, 64.53, 170.26, 661; 340/962, 340/580–582
See application file for complete search history.

(56) References Cited

U.S. PATENT DOCUMENTS

| 3,341,835 | A | | 9/1967 | Werner |
| 3,541,540 | A | | 11/1970 | Hughes |
| 4,222,044 | A | * | 9/1980 | Boschung .................... 340/581 |
| 4,532,806 | A | * | 8/1985 | Bruchmuller ................ 73/579 |
| 4,570,881 | A | | 2/1986 | Lustenberger |
| 5,003,295 | A | * | 3/1991 | Kleven ....................... 340/581 |
| 5,585,551 | A | * | 12/1996 | Johansson et al. .......... 73/64.53 |
| 6,320,511 | B1 | * | 11/2001 | Cronin et al. ............... 340/580 |
| 6,456,200 | B1 | * | 9/2002 | Bostrom et al. ............ 340/580 |

* cited by examiner

*Primary Examiner*—Galen Barefoot
(74) *Attorney, Agent, or Firm*—Blakely, Sokoloff Taylor & Zafman (57) ABSTRACT

Ice detection assembly (100) designed for installation on an aircraft, comprising a vibrating finger (110) and a mast (120), the vibrating finger (110) extending into the air from the mast (120) and capable of being vibrated by vibration means at a resonant frequency that is sensitive to an ice deposit on its surface, characterised in that it comprises a cooling system capable of cooling at least part of the detection assembly (100).

17 Claims, 9 Drawing Sheets

ICE DETECTION ASSEMBLY INSTALLED ON AN AIRCRAFT

FIELD OF THE INVENTION

This invention relates to an ice detection assembly to be installed on an aircraft, such as a plane, to detect ice accretion on surfaces of the aircraft.

BACKGROUND OF THE INVENTION

Ice detection is usually used in aviation during flight to indicate the presence of ice in air surrounding the aircraft.

The reliability and precision of this detection are very important since ice can deteriorate the properties of some parts of an aircraft, such as the aerodynamic properties of wing or engine intake parts, and increase the mass of the aircraft. This can then lead to loss of lift and controllability of the aircraft.

The detection assembly comprises an intrusive part immersed in the air flow surrounding the aircraft, and is typically placed at locations on the aircraft subject to particularly severe icing conditions, such as the aircraft nose or wings, to detect the first signs of ice appearance.

Figure 1:
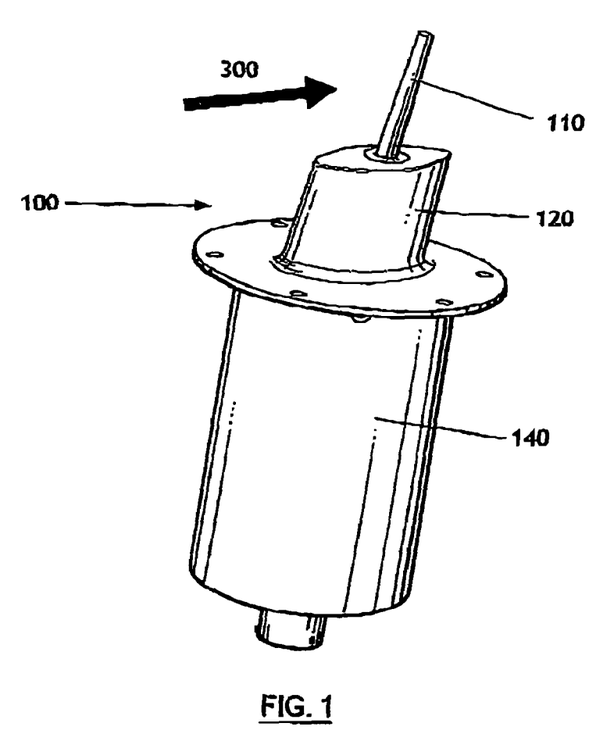
FIG. 1 shows a perspective view of an ice detection assembly.

As shown in FIG. 1, a known detection assembly 100 comprises:
 a mast 120; and
 an elongated finger 110 installed on the mast 120 extending into the surrounding air.

The finger 110 forms an oscillating sensitive element, typically excited by a magnetostrictive or piezoelectric device, with a eigen oscillation frequency sensitive to an ice deposit such that when ice accumulates on the finger 110, the mass of the finger 110 varies and the oscillation frequency changes until it being beyond a determined detection threshold. The ice detection signal is then triggered.

Optionally, this type of detection assembly 100 also comprises a heating system designed to temporarily de-ice the finger 110, in order to do a new ice detection. Thus, the detection assembly 100 is used in successive detection/de-icing cycles.

A Joule effect heating system is conventionally used.

However, this type of detection assembly 100 has a major disadvantage for ice detection around the icing conditions (static temperature of the surrounding air near 0° C.). Indeed, aircraft generates a modification of the aerodynamic field in its near environment (local pressure and speed) as it moves through the air. The detection assembly 100 is also subjected to this modification to the aerodynamic characteristics of the air flow. Thus, the equilibrium temperature of the detection assembly 100 will be less than the total temperature of the flow (temperature including the influence of speed) and will be higher than the static temperature of the environment in which the aircraft is moving, also called the OAT (Outside Air Temperature). The value of this equilibrium temperature above the OAT will increase as the aircraft speed increases.

Thus, when this OAT is equal to or slightly less than the icing temperature, the detection assembly according to prior art will not detect ice even if it is subjected to icing conditions.

A reduction in the aircraft speed bringing the equilibrium temperature of the detection assembly 100 close to the icing temperature will then cause ice appearance on the sensitive element that could have been detected earlier.

Those skilled in the art know that if a finger 110 is inclined at a suitably chosen angle and direction of inclination, the temperature on part of the surface of the finger 110 can be reduced. For example, FIG. 3 document U.S. Pat. No. 4,333,004 shows an inclined finger 110 of this type.

However, this system does not enable a large reduction in the equilibrium temperature, and does not enable any control over the value of this resulting temperature reduction.

Document U.S. Pat. No. 4,570,881 provides information about an ice detector 130 shown in FIG. 18 comprising a flexible membrane 132 to which a piezoelectric transducer 131 is fixed which, under electrical excitation, can vibrate the membrane 132 at a resonant frequency, the vibration frequency of the membrane then varying as a function of the stiffness modified by the accretion of ice on the membrane. This ice detector 130 also comprises a Peltier effect cooling and heating system 135, cooling and heating then being done within icing/de-icing cycles of the membrane.

Figure 18:
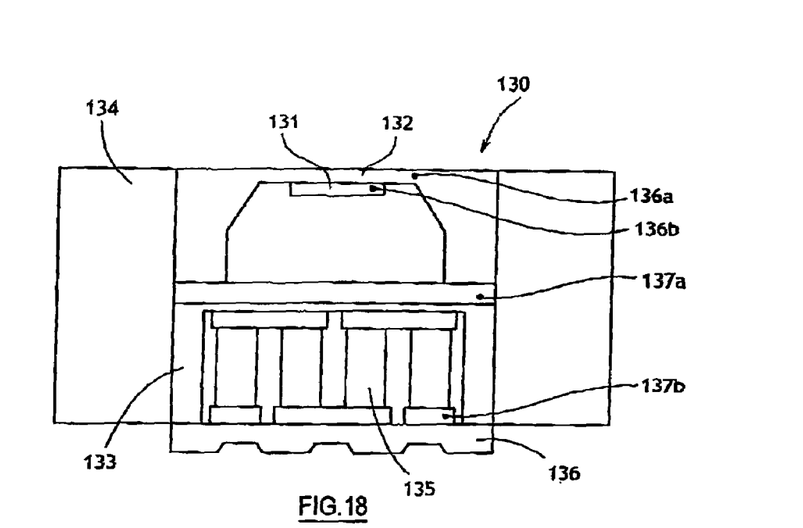
FIG. 18 shows a cross-sectional view of a vibrating membrane ice detector comprising a Peltier system.

Thus, the sensitive element of the ice detector 130 is characterised by a lower equilibrium temperature.

However, this ice detector 130 has a small detection area, and therefore ice detection may be not sufficiently reliable.

Furthermore, it only exposes a single detection face and does not extend in the three dimensions as the distance from the aircraft increases (as the said finger 110 does), which can reduce the quality of the result obtained.

Finally, the use of the Peltier effect implies a de-icing power of the same order of magnitude as the cooling power (of the order of a few watts). The power necessary for fast de-icing of the surface of the sensitive element is much higher (a few tens of watts). Thus, the Peltier system is not adapted to fast de-icing to facilitate a new detection.

SUMMARY OF THE INVENTION

A first purpose of this invention is to make a detection assembly installed on an aircraft capable of detecting ice for OATs close to the icing start temperature.

A second purpose of this invention is to perform this detection precisely, reliably and adjustably.

A third purpose of this invention is to achieve this detection regardless of the size of water drops.

A fourth purpose of the invention is to implement successive icing/de-icing cycles on the detection assembly, such that de-icing is done more quickly.

Consequently, a first aspect of the invention proposes an ice detection assembly intended to be installed on an aircraft, comprising a vibrating finger and a mast, the vibrating finger extending into the air from the mast and capable of being vibrated by vibration means at a resonant frequency that is sensitive to an ice deposit on its surface, comprising a cooling system capable of cooling at least part of the detection assembly.

This type of ice detection assembly advantageously comprises one or more of the following characteristics:
 the cooling system comprises a compression/expansion heat pump system;
 the cooling system comprises a Peltier effect system;
 the finger includes at least part of the said cooling system;
 the finger includes at least two openings connected by at least one crossing channel, so as to create a cooling air flow locally cooling the surface of the finger, thus forming the said cooling system;
 the detection assembly also comprises a flexible membrane device installed on the mast, the vibrating membrane being capable of being vibrated by vibration means at a resonant frequency sensitive to an ice deposit on its surface and being cooled by at least part of the said cooling system;

the membrane is located on a leading surface of the mast, in other words a surface of the mast facing the air flow;

the leading surface of the mast is bevelled, the surface of the bevel being at a determined angle from the direction of the air flow;

the said bevelled surface is concave;

the membrane device is located on a side of the mast, in other words on a lateral surface with respect to a surface of the mast facing the air flow;

the detection assembly also comprises a temperature sensor capable of measuring the temperature of the finger;

the detection assembly also comprises a temperature sensor designed to measure the temperature of the vibrating membrane;

the detection assembly comprising at least one temperature sensor capable of measuring the temperature representative of the total or static temperature of the surrounding air, connected to means for controlling the cooling system;

the ice detection assembly also comprises at least one temperature sensor capable of measuring a temperature representative of the total or static temperature of the surrounding air, connected to means for deciding which one of the finger or the membrane will supply ice-detection data to means of processing, this decision depending on temperature data supplied by at least the temperature sensor;

the ice detection assembly comprises a temperature sensor capable of measuring the equilibrium temperature of the finger and/or the temperature representative of the membrane, that are slaved to the total or static temperature of the surrounding air using the appropriate cooling system;

when the temperature measured by at least the sensor is less than about −5° C., data from the finger will be supplied to the processing means, and for higher temperatures, data from the membrane will be supplied to the processing means;

the ice detection assembly also comprises a de-icing system;

de-icing and cooling functions are performed by the same device.

BRIEF DESCRIPTION OF THE DRAWINGS

Other characteristics and advantages of the invention will become clear from the following description that is purely illustrative and non-limitative, and should be read with reference to the attached drawings in which.

DETAILED DESCRIPTION OF THE INVENTION

As shown in FIG. 1, an ice detection assembly 100 according to the invention comprises:

a mast 120;

an elongated finger 110 extending into the surrounding air from the mast 120 to which it is bonded, usually transverse to the air flow;

a system for cooling at least a part of the detection assembly (not shown in FIG. 1).

The mast 120 may be in the shape of a symmetric wing profile or of an ellipse.

An attachment flange 140 is usually provided to hold the detection assembly 100 in place and fixed onto an attachment surface outside the aircraft.

A box (not shown) is fixed to the flange 140, extending inwards into the aircraft through the attachment surface, for containing and for protecting electrical connections and circuits necessary for operation of the detection assembly 100. In particular, this box comprises the different electrical equipment, electronic cards and components used to supply and control the frequency excitation of the detector(s) in the detection assembly 100, for doing measurements, for supplying energy, for electromagnetic shielding, for making connections, etc.

This type of ice detection assembly 100 signals the presence of ice in the immersion air flow.

As already explained, the detection principle is based on a mechanical oscillator which is the finger 110.

The resonant frequency of the finger 110, created by electrical excitation, is chosen to be non-sensitive to the air flow velocity, particles (sand, dust, etc.), rain and contaminants (hydrocarbons, etc.). This oscillation frequency is chosen to be more than about 20 kHz, so that it is not sensitive to the aircraft vibration spectrum, while having enough energy to signal the presence of ice on its surface.

The oscillation frequency of the finger 110 depends on the mass of ice accumulated on the surface of the finger 110 according to the following relation:

$$f = 2\pi \sqrt{\frac{k}{m}} \quad (1)$$

the mass of ice depending on the capture factor of the sensitive element and the local LWC (Liquid Water Content) in the air flow, that itself depends particularly on the velocity of the water drops and the geometry of the aircraft.

Therefore, a reduction in the oscillation frequency of the finger 110 will signal ice detection, if it decreases below a determinated critical threshold.

The finger 110 must extend sufficiently far into surrounding air to improve the ice capture efficiency and to do the measurement in an area less subjected to the aerodynamic disturbances related to the aircraft motion.

First of all, it must be sufficiently long.

Typically, the finger 110 exposed to the flow measures between about 45 and 65 millimeters.

Therefore its extension from the mast 120 will be approximately perpendicular.

However, in one particular and sometimes preferred case, the finger 110 extends in a direction that depends on the direction of the air flow, at a given angle.

For example, this angle may be between 0° and about 40° from the downstream direction of the airflow.

The main purpose of this inclination of the finger 110 is to create under and overpressure area on the surface of the finger 110, in order to:
  reduce the temperature of the wall of the finger and therefore improve ice detection around the icing temperature, and
  facilitate elimination of ice while de-icing (if the detection assembly 100 is provided with a de-icing system) by enabling ice to slide on the surface of the finger 110.

Furthermore, this finger 110 may be parallelepipedic or of any other shape with a section varying from a large section at the mast 140 level to a small section at its end.

A shape with a variable section, such as a cone or a superposition of cylinders each with a smaller base than the previous cylinder, may be preferred to a parallelepipedic shape, so as to make ice detection uniform over the entire surface of the finger 110, as recommended in document EP 03290582.0 (application reference).

Modifications to the characteristics of the air surrounding the aircraft (due to a modification in the aerodynamic field around the aircraft caused by its fast movement in air) discussed above affect the temperature, and also the concentration profile of water droplets as a function of the distance from the surface of the aircraft, that varies depending on the size of water drops. For example, depending on the location, there will be more large water drops (for example with a diameter of the order of 50 µm) close to the aircraft surface than small water drops (for example with a diameter of the order of 20 µm), and this trend is inverted as the distance from the surface increases. The distances over which this lack of homogeneity in the size of water drops occurs can then vary up to several centimeters.

Thus, document EP 03290582.0 (application reference) recommends that a conical finger 110 should be used to optimise homogeneous detection of water droplets, to compensate for non-homogeneity of concentrations and sizes of water drops present in the different air flows around the periphery of the aircraft.

Advantageously, the finger 110 is mechanically excited by a voltage controlled piezoelectric ceramic, over a frequency range containing its mechanical resonant frequency sensitive to an ice deposit.

A second piezoelectric ceramic generates a voltage that depends on the resonant frequency of the finger 110, this electrical information forming the detection information.

In one embodiment, the resonant frequency used may be between 20 and 30 kHz.

The ice deposit will cause a drop in the eigen frequency of the finger 110. Indeed, ice deposit involves increasing of the finger mass.

The detection assembly 100 is provided with a system for cooling at least one of its parts, in order to improve its ice detection capacity for an OAT close to the icing temperature (near 0° C.).

First Ice Detection Assembly According to the Invention

Figure 2:
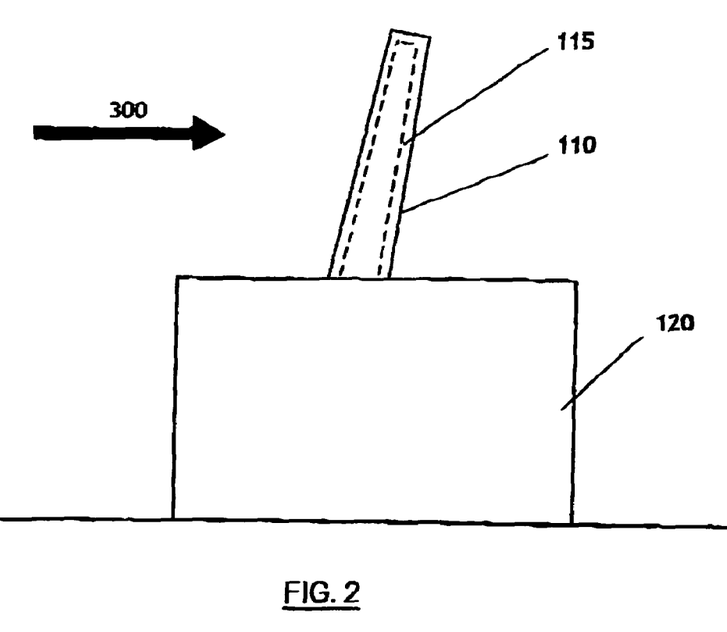
FIG. 2 shows a diagrammatic cross-sectional view illustrating a first detection assembly according to the invention, comprising a first type of cooling system.

In a first configuration according to the invention, the system for cooling the detection assembly 100 is located under the outer surface of the finger 110. Thus, its temperature $T_{finger}$ is less than the air temperature $T_{air}$ flowing around the detection assembly 100, so that in the presence of water droplets, ice accretion is caused on the surface of the finger 110 when ice appears on the most sensitive parts of the aircraft.

This cooling means then accelerates ice detection.

The cooling system for the finger 110 may then be of different natures.

Non-limitatively, it may be based on:
  (1) the concept of the Peltier effect;
  (2) the concept of a cooling fluid circulating in the wall of the finger 110;
  (3) the principle of a heat pump using a compressed and expanded gas, circulating in the finger wall.

Concerning item (2) and as shown in FIGS. 3 to 7, the cooling fluid can be circulated in a fluid circulation assembly internal to finger 110 comprising at least one air inlet opening 117 from the outside, at least one air outlet opening 118 towards the outside, and at least one air circulation channel 116 between the air inlet opening(s) and the air outlet opening(s) 119.

The air flow that is oriented along direction 300 reaches the finger 110 (at its wall 112, also called "leading edge", that is first subjected to potential ice accretion), and goes around the finger 120. Due to the pressure difference between the inlet 117 and outlet 119 of the internal channel, part of the air will enter the inlet openings 117, to pass through the air circulation channel 116 and exit through the outlet opening(s) 119.

Inlet air at a local static temperature less than the temperature of the leading edge of the finger, circulates in the finger 110 and then cools it.

This phenomenon can be explained by the reduction in the finger 110 capacity to recover the total temperature of the surrounding air ($T_{air}$) (which is greater than the static temperature of the surrounding air, or the OAT).

Thus, the wall temperature Tp of the finger 110 (or of a body in general) immersed in an air flow, satisfies the following relation:

$$OAT \leq Tp \leq Tt_{air}$$

The finger 110 capacity to recover the total air temperature $Tt_{air}$ is measured by its recovery factor β defined by the following formula:

$$Tp = OAT * \left(1 + \beta\frac{y-1}{2}M^2\right)$$

wherein:

M is the Mach number of the aircraft,

OAT is the static temperature of the medium in which the aircraft is moving,

γ is equal to 1.4 for air.

Thus, when the factor β decreases (β being between 0 and 1) at fixed values of OAT and M, the wall temperature Tp of the finger 110 reduces.

The presence of openings 117 and 119 on the surface of the finger 110 reduces its recovery factor β which causes a reduction of the surface temperature exposed to the air flow Tp.

The surface temperature Tp of the finger 110 then becomes closer to the OAT.

Tp can thus be several degrees lower than $Tt_{air}$ depending on the flow velocity.

These inlet openings 117 and outlet openings 119 may be located anywhere along the surface or the finger 110 along for the surface of the air leading edge 112 (see FIGS. 6 and 7), the location at which ice is accreted.

Figure 3:
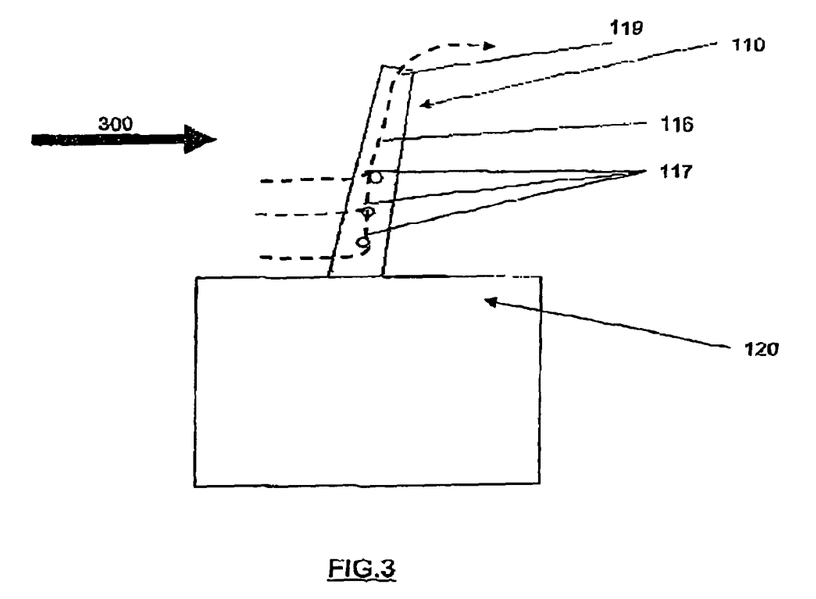
FIG. 3 shows a diagrammatic lateral sectional view illustrating a first detection assembly according to the invention, comprising a second type of cooling system.
Figure 4:
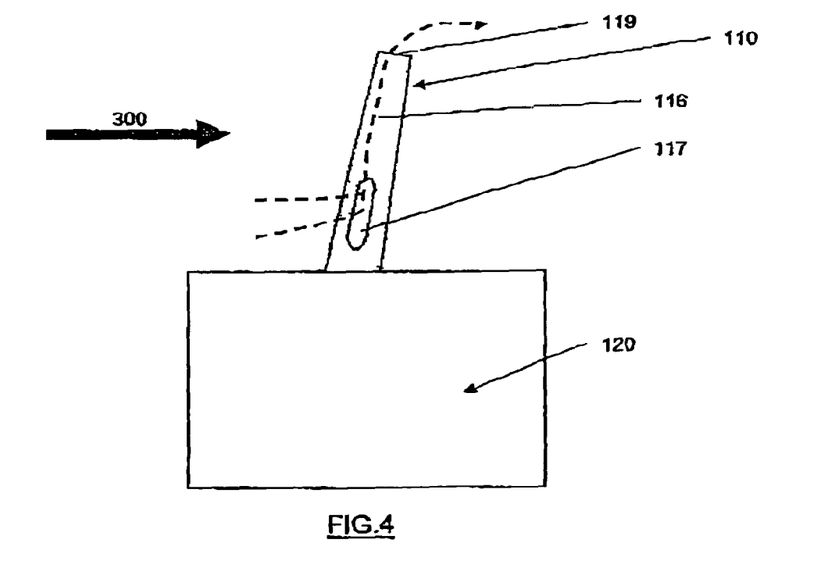
FIG. 4 shows a diagrammatic lateral sectional view illustrating a first detection assembly according to the invention, comprising a second type of cooling system
Figure 5:
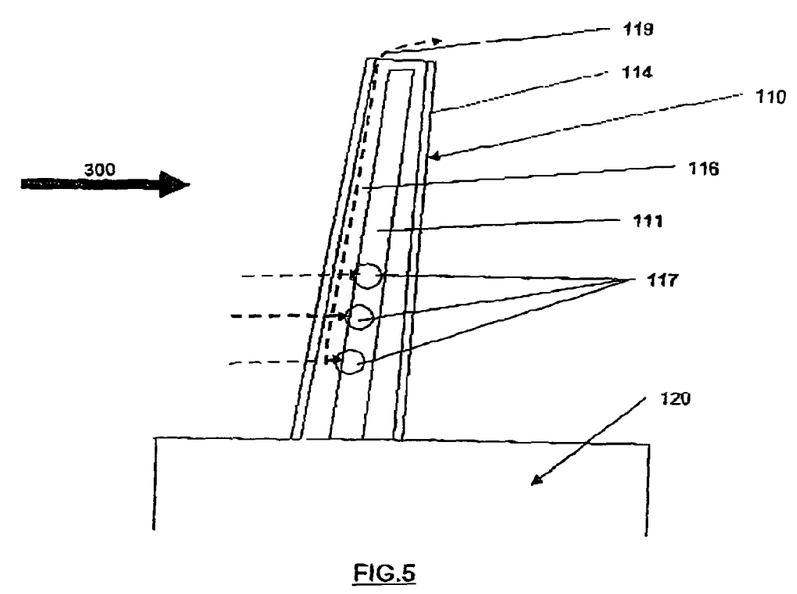
FIG. 5 shows a longitudinal sectional view illustrating the first detection assembly shown in FIG. 3.

The inlet openings 117 of finger 110 shown in FIGS. 3 to 5 are at the mid point of the chord along the direction of the air flow 300.

Depending on the profile of the finger 110, the position of these inlet openings 117 on the profile of the finger 110 may be chosen particularly so as to minimise the recovery factor β and to prevent water drops from entering inside the finger 110.

Air inlet openings 117 may be matched to the surface of the finger 110 at the same height or at offset heights depending on the side of the finger 110 on which they are located. In particular, they may be located longitudinally along the main axis of the finger 110. They may be symmetric about this axis, particularly in order to equalise the air flow in the finger 110.

As shown in FIG. 3, the finger 110 has several small air inlet openings 117, each approximately circular.

As shown in FIG. 4, the finger 110 has one air inlet opening 117 on a side face that is large and is in the form of a groove.

However, the air inlet opening(s) 117 or air outlet opening(s) 119 may be of any other shape (square, triangle, rectangular, elliptical, etc.) and of any other size.

The air outlet opening(s) 119 may be located at the end of the finger 110, as shown in FIGS. 3 to 5.

The dimensions of the openings 117 and 119 are chosen so as to obtain a sufficient flow inside the finger 110. In the finger 110, the air flows from the lower part (at the end of the mast 120) to the top part (end 119 of the finger 110) due to a negative pressure effect at the top end of the finger 110, mainly due to the high flow velocity at this level.

The air circulation channel 116 may be of any shape so as to connect the inlet opening(s) 117 to the outlet opening(s) 119.

For example, it may be cylindrical or in the shape of a truncated cone extending longitudinally along the axis of finger 110, as shown in FIG. 5.

It may also consist of a space between the external walls 114 of the finger 110 and a second volume 111 internal to the finger 110 extending around the axis of the finger 110.

Figure 6:
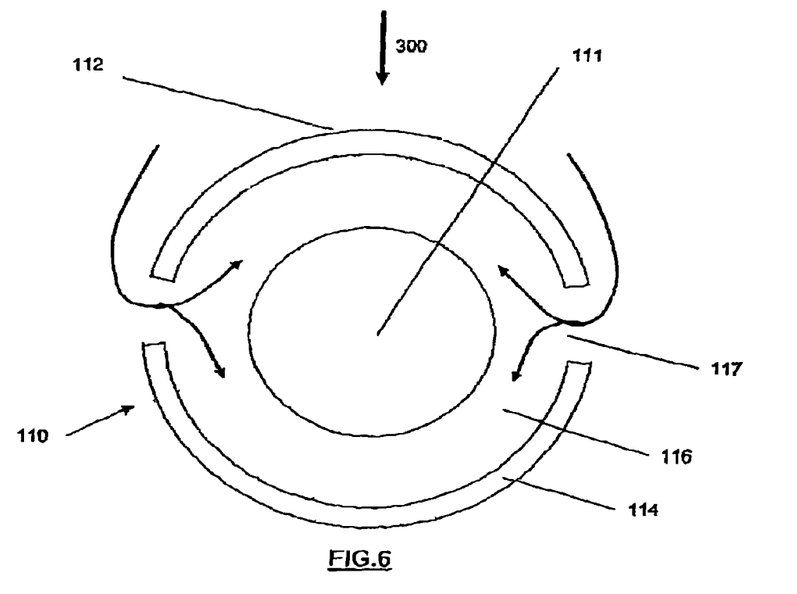
FIG. 6 shows a diagrammatic cross-sectional view illustrating the first detection assembly according to the invention, the cross-sectional view being taken through the vibrating finger forming part of it, the vibrating finger comprising the second cooling system.
Figure 7:
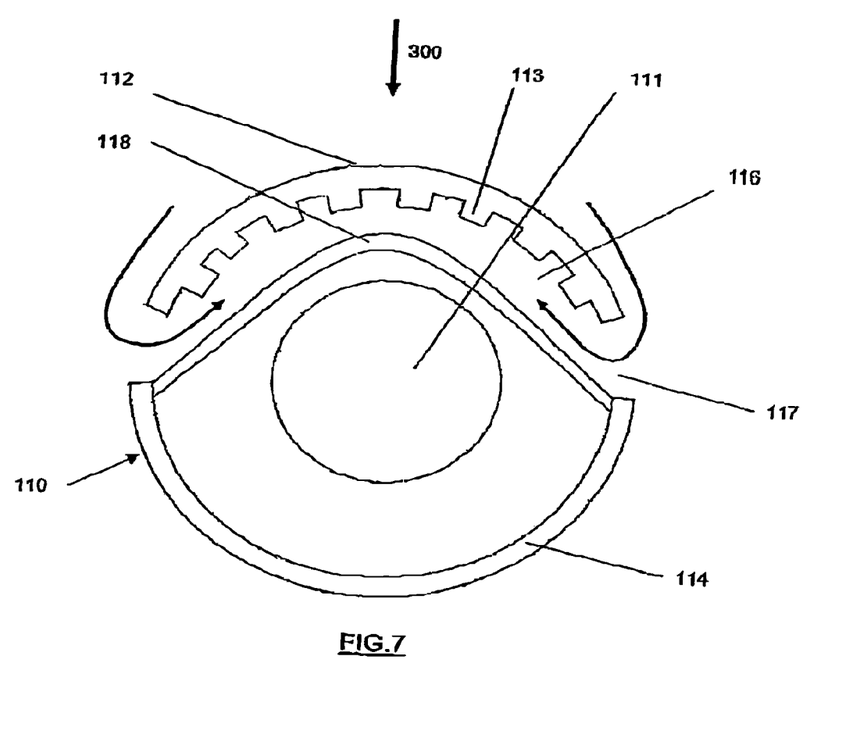
FIG. 7 shows a diagrammatic cross-sectional view illustrating the first detection assembly according to the invention, the cross-sectional view being taken through the vibrating finger forming part of it, the vibrating finger comprising a variant of the second cooling system.

For example, this second volume 111, like that shown in FIGS. 5, 6 and 7, having a cylindrical or truncated conical shape, may extend along the axis of the finger 110.

In one optional and advantageous configuration of the invention, this solid volume 111 comprises a de-icing system.

It is then desirable if this heating system 111 does not come into contact with the internal surface 114 of the finger 110 to enable air flow in the finger through the said channel 116.

More generally, the finger 110 may comprise a heating system, preferably shielded for example by a steel tube, in order to eliminate ice accretion by the Joule effect.

The heating system may be triggered as soon as the ice detection threshold is exceeded the finger 110 frequency.

In one particular configuration, and as shown in FIG. 7, the internal surface of the leading edge 112 of the finger 110 has a toothed profile 113.

Thus, the surface temperature Tp of the finger 110 is even lower than its equilibrium temperature.

The toothed profile 113 of the internal surface of the leading edge 112 increases the heat exchange area between the air and the finger 110, the temperature of the wall exposed to the external air flow 300 is therefore reduced, due to heat transfer through the wall 112 created by the internal flow and the teeth 113 of the wall.

Teeth 113 dimension and shape are adapted to obtain an optimised compromise between the exchange area and the size of the channel 116 in the finger 110.

Optionally, the channel 116 has a narrowed section (for example by placing a wall 118 closing off access to part of the initial channel 116 to the air flow), and thus forcing ventilation of the internal wall of the part exposed to the flow and increasing the air velocity. Thus, the heat exchange factor between the wall and air can be increased.

Depending on the concept chosen for cooling the finger 110, the cooling system may be reversible so as to de-ice the finger 110 when the detection threshold is reached. Therefore, it will heat the wall of the finger to above 0° C. and eliminate ice so that the frequency of the finger 110 can return to its value during nominal operation, in other words without ice accretion.

In particular, this can be achieved by using a Peltier effect device for cooling, while heating is achieved by reversing the direction of the dc power supply to the system.

In another case, a heating system may be separate from the cooling system.

For example, FIG. 5 shows that the cooling system formed by aeration openings 117 and the channel 116 is separate from a central heating system 111.

An adjustable cooling system in the finger 110 (for example a Peltier effect system) may have several advantages for ice detection.

thanks to a feedback using the temperature of the finger 110 and the temperature representing the total flow temperature (measuring for example on the mast 120), the finger 110 can be cooled below the temperature of the wall of the mast 120, always keeping the same temperature gap, for example the finger 110 being 4° C. colder than the mast 120.

In particular, the temperatures of the mast 120 and the finger 110 may be measured, within the recovery error, by temperature probes placed on or in the wall of each of these two elements.

This cooling system can regulate the temperature of the leading edge of the finger 110 to the static temperature of the surrounding air or OAT, which is obtained using a computer, mainly based on Mach information and the total flow temperature.

The cooling system can stabilise the temperature of the finger 110 at a constant temperature slightly below 0° C. or even fixed at 0° C. This type of system can provide a solution to the need of detecting the "Ludlam effect" ["Ludlam effect" being a phenomenon that occurs when the aircraft is moving in an environment in which the OAT is close to 0° C., due to the disturbance of the aerodynamic field, surface temperatures on some parts of the aircraft are then lower than the critical icing temperature. Ice accretion can then occur on these parts].

The purpose of these various functions is to improve the ice detection capacity for an OAT close to the icing temperature (around 0° C.).

These cooling functions can be controlled by the electronic part located in the said box of the ice detection assembly 100.

Second Ice Detection Assembly 100 According to the Invention

Figure 8:
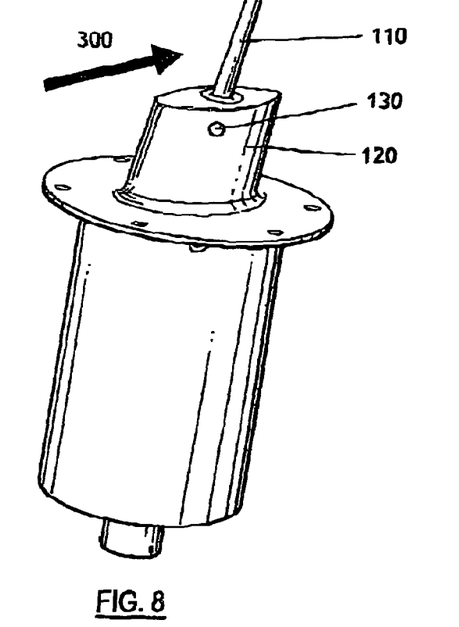
FIG. 8 shows a perspective view of a second ice detection assembly according to the invention, and that comprises a vibrating membrane.

As shown in FIG. 8, the detection assembly 100 also comprises a vibrating membrane device 130 capable of mechanically vibrating a membrane from an electrical excitation.

The vibrating membrane device 130 is preferably circular.

Figure 9:
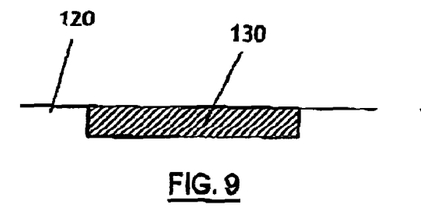
FIG. 9 shows a detailed sectional view of a first configuration of the second detection assembly shown in FIG. 8, the section being taken through the membrane.
Figure 10:
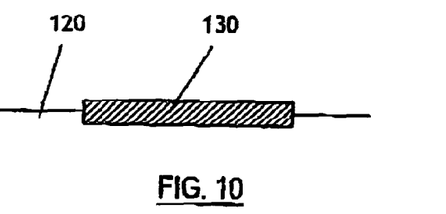
FIG. 10 shows a detailed sectional view of a second configuration of the detection assembly shown in FIG. 8, the section being taken through the membrane.

The vibrating membrane device 130 is flush with the wall of the mast 120 as shown in FIG. 9, or projects slightly from the wall, as shown in FIG. 10.

This vibrating membrane device 130 is adapted to the shape of the wall on which it is positioned.

The finger 110 and the membrane of the vibrating membrane device 130 are mechanically excited by a voltage controlled piezoelectric ceramic on a frequency range containing their respective mechanical resonant frequency sensitive to an ice deposit.

A second piezoelectric ceramic generates a voltage that depends on the resonant frequency of the finger 110, this electrical information being the detection information.

For the finger 110, the resonant frequency used is advantageously between about 20 and about 30 kHz.

For the membrane in the membrane device 130, the resonant frequency is advantageously between about 1 kHz and about 50 kHz.

As already explained, the ice deposit reduces the eigen frequency of the finger 110, the eigen frequency being chosen for not being sensitive to dust, water, oil, etc.

Ice deposit increases the resonant frequency of the membrane since the stiffness k of the membrane is increased by this deposit more than its mass m (the said formula (1) also being useable for the membrane).

Unlike the finger 110, the deposition of a material such as water, dust or oil causes a drop in the vibration frequency of the membrane since the mass m is increased. It is thus possible to distinguish a deposit of ice from other materials on the membrane.

De-icing of sensitive elements and the mast 120 is advantageously triggered when ice is detected, when the "Ice" signal is triggered.

This de-icing may be done in the mast 120 using heating cartridges inserted in the wall of mast 120 which, at the same time, de-ice the oscillating membrane by conduction.

Once the ice has been eliminated, de-icing is stopped and a new detection can start after a given time.

Figure 11:
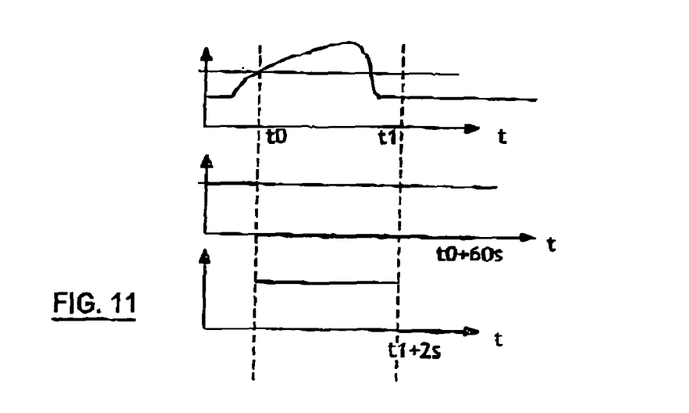
FIG. 11 shows three graphs representing operation of a vibrating membrane during ice accretion and showing the variation in time of the vibration frequency, heating and detection signal.

For illustration purposes and as shown in FIG. 11, in which the first graph represents the variation with time of the oscillation frequency of the membrane between two successive de-icing operations, it can be seen that after de-icing, ice accumulates gradually until it goes beyond the detection threshold at time $t_0$ (corresponding to the time taken by the de-icing system to cool and for ice to form again).

As shown in the third graph in FIG. 11, de-icing of the membrane 130 is then started and stopped when ice quantity is such that the frequency of the membrane 130 goes beyond a detection threshold (at time $t_1$). Advantageously, de-icing stops later than t1, at a time equal to $t_1+\Delta t$, (where in this case $\Delta t$ is equal to 2 seconds), the justification for this $\Delta t$ being to protection of the system by ensuring the finger 110 well de-iced.

As shown in the second graph in FIG. 11, a "ice detected" signal is sent at time $t_0$ (its characteristic signal being sent to the aircraft cockpit to inform the crew and/or to management means). The duration of the ice detection signal is constant. In the case described here, it is equal to 60 seconds starting from when the frequency threshold is exceeded. The membrane device 130 may be in multiple locations.

Figure 12:
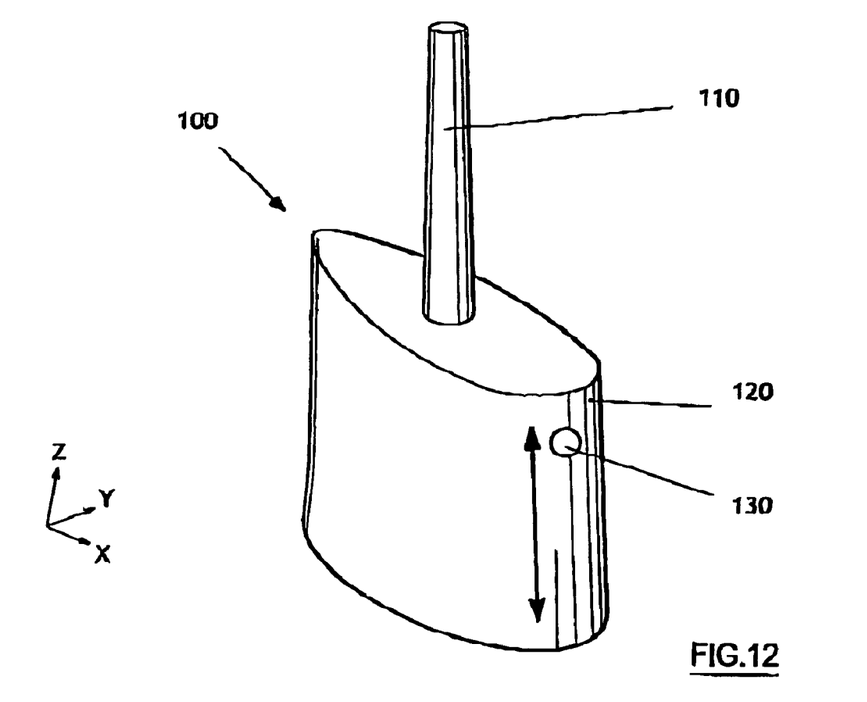
FIGS. 12 to 17 show perspective views illustrating different configurations of detection assemblies comprising a vibrating membrane according to the invention.

As shown in FIG. 12, the membrane device 130 may thus be located on the leading edge of the mast 120 by the air flow, in other words facing the air inlet 300 (its position may be moved along the black double arrow). The membrane is thus directly exposed to the air flow and ice particles. This position can then give a maximum capture factor and therefore an improved detection time.

Figure 13:
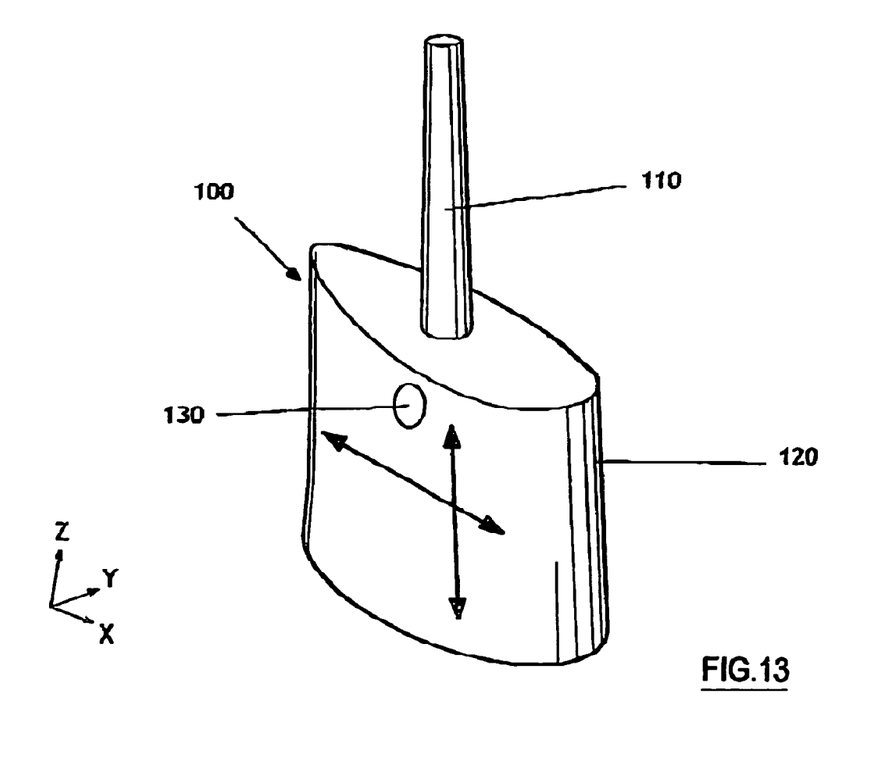

As shown in FIG. 13, the membrane device 130 may also be placed on one of the sides of mast 120, in other words on a surface adjacent to the surface facing the air flow. This position makes it possible to lower the temperature of the membrane under the total flow temperature due to the recovery phenomenon. This is the position in which the lowest wall temperature of the profile is obtained for a NACA-type profile, due to recovery. Thus, for an OAT close to 0° C., the membrane placed on the side of the mast 120 enables ice detection, by accumulating ice resulting from runoff of water along the profile, before accretion on an uncooled vibrating finger 110.

Therefore, the detection capacity of the membrane is better than the detection capacity of an uncooled vibrating finger 110 at about 0° C.

Figure 14:
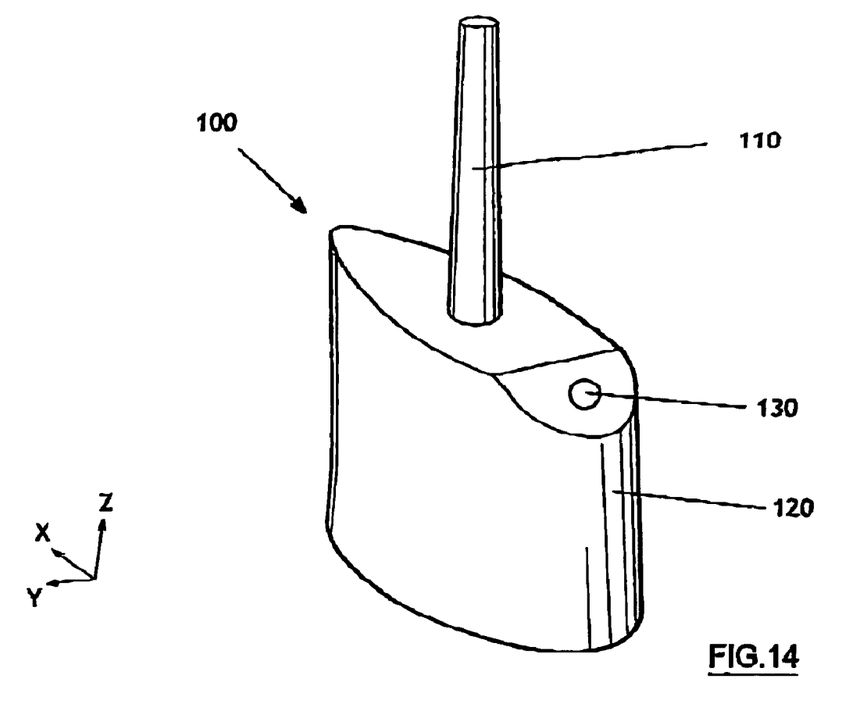
Figure 15:
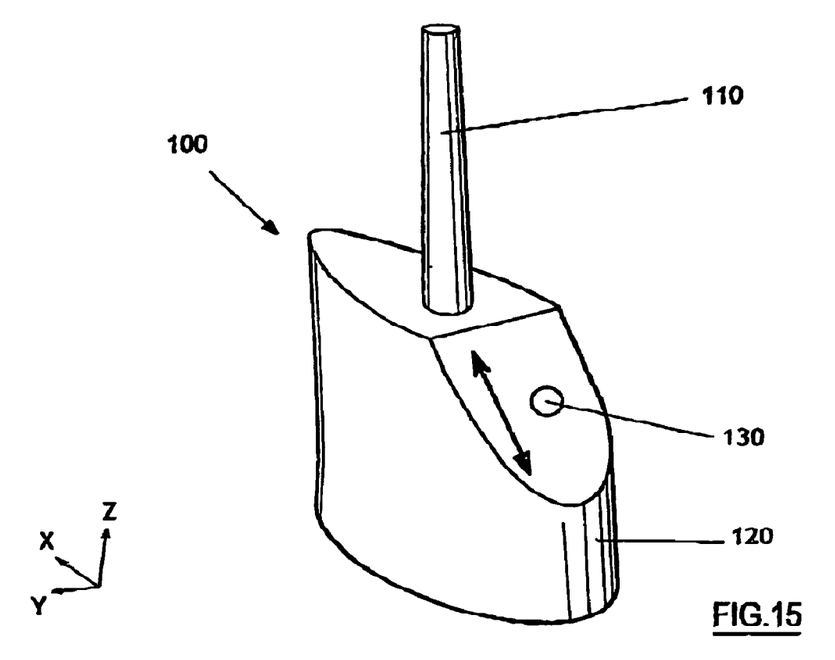
Figure 16:
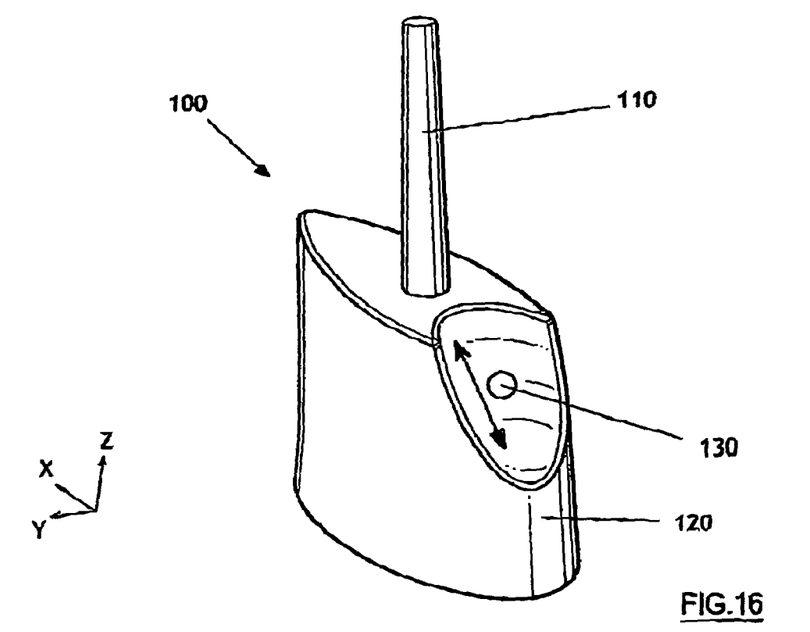

As shown in FIGS. 14 and 16, the surface of the mast 120 directly exposed to the wind may be bevelled to receive the membrane device 130 on a surface for which the type of icing conditions is determined as a function of the chosen angle of the bevel from the air leading surface.

As a variant, this bevelled surface may also be concave forming a gutter, as shown in FIG. 16.

Membranes located on these bevelled, plane or concave surfaces are then sensitive to the deposit of large ice droplets (MVD>100 μm), which are too inert to be deviated and move towards finger 110. Thus, in the presence of large droplets, the membrane will detect ice faster than the finger 110.

Figure 17:
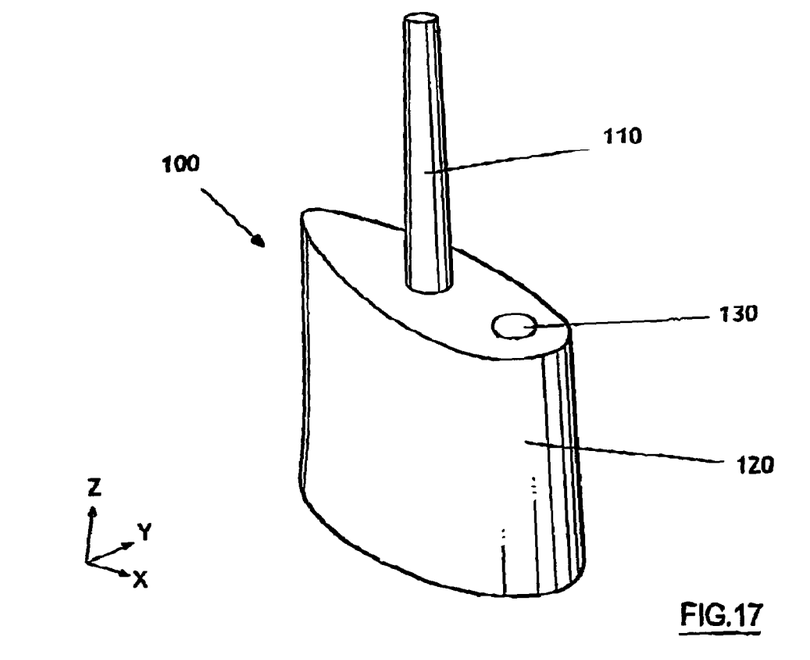

As shown in FIG. 17, the membrane device 130 is located on the mast 120 at the bottom of the finger 110.

Figure 19:
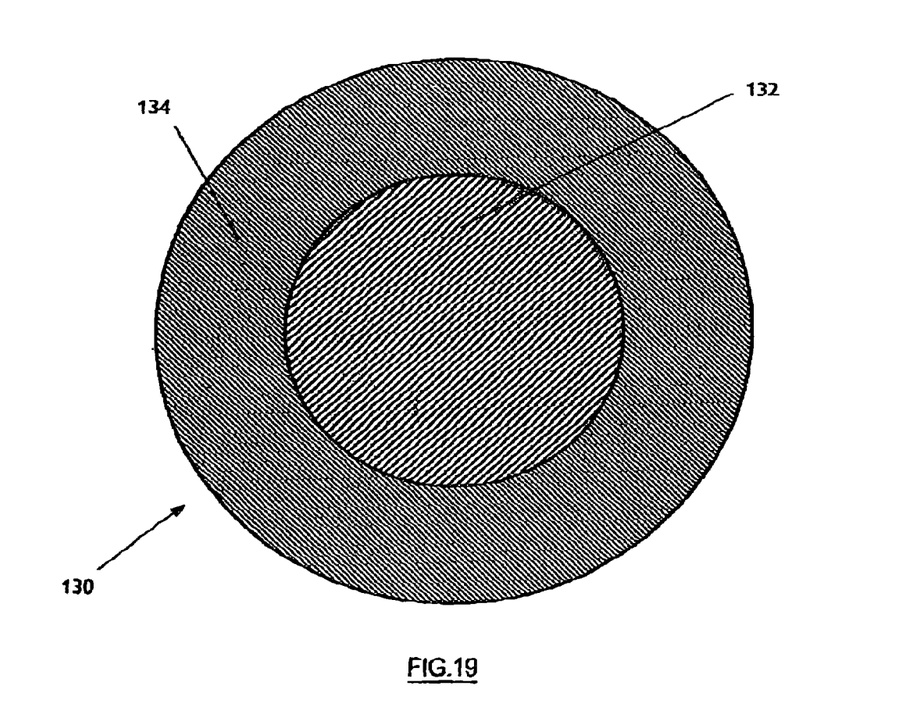
FIG. 19 shows the vibrating membrane ice detector shown in FIG. 18, viewed from the membrane side.

FIGS. 18 and 19 show an example of a membrane device 130 that can be used for the purposes of the invention.

This device is similar to that disclosed in document U.S. Pat. No. 4,570,881 and comprises a flexible membrane 132 to which a piezoelectric cell 131 is fixed on the inner surface. Application of an alternating voltage to the piezoelectric cell 131 (by means of a conducting cable 136b, the return being through the cable 136a) starts the piezoelectric cell vibration, and the vibration is then transmitted to the membrane 132. The membrane 132 is suspended on a metallic plate 133 extending on an insulating ring 134. The inner face of the insulating ring 134 is closed by a heat sink 136. Peltier elements 135 thermally connected to the heat sink 136 and the metallic plate 133 are arranged on the inside of the insulating ring 134. The membrane 132 is also thermally coupled to the metallic plate 133. The Peltier elements 135 are connected to a dc power source (through cables 137a and 137b).

The Peltier type system 135 installed under the membrane 132 cools or heats the membrane 132 below or above the ambient air temperature or a reference temperature by inverting the direction of the power supply current.

This detection assembly 100 may include a temperature probe placed just beside to the membrane device 130, measuring a temperature representative of the membrane temperature, and a temperature probe placed on the wall of the mast 120 that measures a temperature representative of the total or static temperature of the ambient air and that can be used as a reference.

One possible use of the two probes and the Peltier system is regulation or the temperature of the membrane to a temperature below the ambient air or reference temperature (for example less than 2° C.), by slaving the system.

Another possible use is regulation of the membrane temperature to a constant temperature less than 0° C., thus potentially enabling detection of the "Ludlam effect" described above.

The measurement of the ambient air temperature can also help to introduce temperature ranges within which the use of the finger 110 or the membrane 132 is more attractive for the detection performance.

Thus, for example, the use of a cooled membrane 132 may be more judicious at total temperatures of more than for example −5° C., since it is more sensitive to ice deposit at these temperatures close to 0° C. In this case, the "Ice detected" information could originate from the membrane 132 rather than the finger 110.

On the other hand, for total temperatures of less than −5° C. use of the finger 110 in particular would improve the response time for the "Ice detected" information, and the reliability of the measurements. The finger 110 would then be used for ice detection.

Consequently, a control system could be provided in the box to decide which one of the two kinds of information respectively originating from the two detectors (i.e. the finger 110 or the membrane 132) will be processed in priority by the processing means, depending on the data received from the two temperature sensors.

Thus, either one of the two ice detectors can be used.

Third Ice Detection Assembly 100 According to the Invention

This detection assembly is a combination of the two previous detection assemblies, in other words it comprises a cooled finger 110 described in the first ice detection assembly and a cooled vibrating membrane device 130 described in the second ice detection assembly.

Advantageously, the finger 110 and the membra ne device 130 each comprise a de-icing system as described above.

The invention claimed is:

1. Ice detection assembly intended to be installed on an aircraft, comprising a vibrating finger and a mast, the vibrating finger extending into the air from the mast and capable of being vibrated by vibration means at a resonant frequency that is sensitive to an ice deposit on its surface, comprising a cooling system capable of cooling at least part of the vibrating finger.

2. Ice detection assembly according to claim 1, wherein the cooling system comprises a compression 1 expansion heat pump system.

3. Ice detection assembly according to claim 1, wherein the cooling system comprises a Peltier effect system.

4. Ice detection assembly according to claim 1, wherein the finger comprises at least part of the said cooling system.

5. Ice detection assembly according to claim 4, wherein the finger comprises at least two openings connected by at least one crossing channel so as to create a cooling air flow capable of locally cooling the surface of the finger, thus forming at least partly the said cooling system.

6. Ice detection assembly according to claim 1, 2, 3, 4 or 5 further comprising a flexible membrane device installed on the mast, the vibrating membrane being capable of being vibrated by vibration means at a resonant frequency sensitive to an ice deposit on its surface and being cooled by at least part of the said cooling system.

7. Ice detection assembly according to claim 6, wherein the membrane device is located on a leading surface of the mast, in other words a surface of the mast facing the air flow.

8. Ice detection assembly according to claim 7, wherein the leading surface of the mast is bevelled, the surface of the bevel being at a determined angle from the direction of the air flow.

9. Ice detection assembly according to claim 8, wherein the said bevelled surface is concave.

10. Ice detection assembly according to claim 6, wherein the membrane device is located on a side of the mast, in other words on a lateral surface with respect to a surface of the mast (120) facing the air flow.

11. Ice detection assembly according to claim 4, comprising a temperature sensor capable of measuring the temperature of the finger.

12. Ice detection assembly according to claim 4, comprising a temperature sensor capable of measuring a temperature representative of the temperature of the membrane.

13. Ice detection assembly according to claim 1, 11 or 12, wherein comprising at least one temperature sensor capable of measuring a temperature representative of the total or static temperature of the surrounding air, connected to means for controlling the cooling system.

14. Ice detection assembly according to claim 6, wherein comprising at least one temperature sensor capable of measuring a temperature representative of the total or static temperature of the surrounding air, connected to means for deciding which one of the finger or the membrane will supply ice-detection data to means of processing, this decision depending on temperature date supplied by the at least temperature sensor.

15. Ice detection assembly according to claim 14, wherein, when the temperature measured by the at least sensor is less than about −5° C., data from the finger will be supplied to the processing means, and for higher temperatures, data from the membrane will be supplied to the processing means.

16. Ice detection assembly according to claim 1, further comprising a de-icing system.

17. Ice detection assembly according to claim 16, wherein de-icing of the de-icing system and cooling of the cooling system are performed by the same device.

* * * * *